March 1, 1932. C. RINGWALD 1,847,226
COMBINED DRINK MIXER AND JUICE EXTRACTOR
Filed Oct. 14, 1929
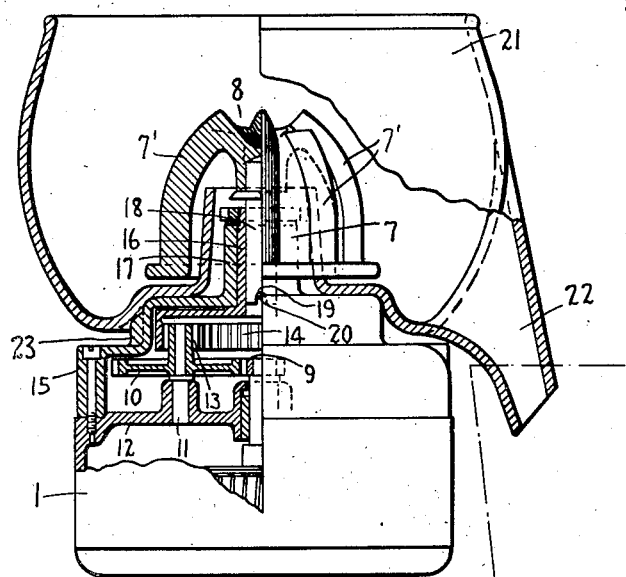
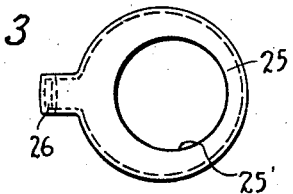
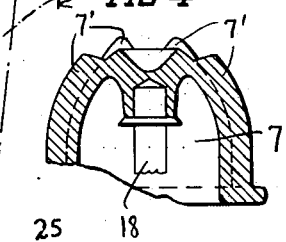
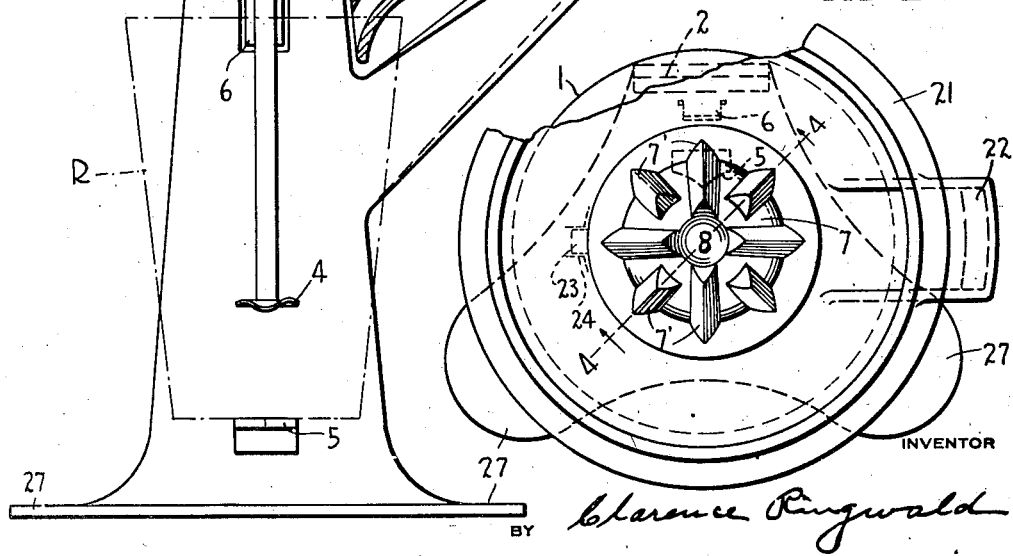
INVENTOR
Clarence Ringwald
Staley & Welch
ATTORNEYS Patented Mar. 1, 1932

1,847,226

UNITED STATES PATENT OFFICE

CLARENCE RINGWALD, OF NORTH HAMPTON, OHIO, ASSIGNOR TO ROBBINS & MYERS, INC., OF SPRINGFIELD, OHIO, A CORPORATION OF OHIO

COMBINED DRINK MIXER AND JUICE EXTRACTOR

Application filed October 14, 1929. Serial No. 399,413.

This invention relates to combined juice extracting and mixing machines.

One of the objects of the invention is to provide a machine of this character which has a support for a receptacle for the juice from the juice extractor, which support also acts, when a receptacle is absent therefrom, to convey the juice to another receptacle which has been placed in operative relation with the mixer.

A further object of the invention is to provide such an arrangement of the juice extracting mechanism, the motor and the connections between said mechanism and motor, that the extracting mechanism will be in direct alignment with the motor in order that the space occupied may be reduced to the minimum.

A further object is to provide a juice extracting element so formed that the juice of certain kinds of fruits such as a naval orange may be extracted but the core at the blossom end left untouched, thereby eliminating the possibility of imparting a bitter flavor to the juice caused by disturbance of the core.

Other objects and advantages will appear from the following description and claims.

In the accompanying drawings:

Fig. 1 is a front elevation, partly in section, of my improved device.

Fig. 2 is a fragmentary top plan view.

Fig. 3 is a top plan view of a detail on a reduced scale.

Fig. 4 is a section on the line 4—4 of Fig. 2.

Referring to the drawings, 1 is an electric motor which is secured in any suitable manner to a bracket 2. The lower end of the motor shaft 3 of the motor extends downwardly and to its lower end is fastened an agitator or mixer 4 of any suitable form. Near the lower end of the bracket an outturned ledge 5 is secured to form a rest for a receptacle R, which may be an ordinary tumbler, the receptacle being retained in position on the ledge by inserting the rim under a tongue 6 which is cut and pressed in the bracket.

The juice extractor is shown as a reamer 7 of a well known parabolic conoid form having short and long ribs running from the base to the vertex with the exception that in the present case the vertex is removed and replaced by a crater-like cavity with the long ribs terminating at the edge of the cavity. It is the usual custom in extracting the juice of such fruits as oranges to cut the fruit in halves transversely across the core and intermediately between the stem and blossom ends, and pressing the hemispheres so formed against the revolving reamer. With such fruits as seedless oranges, there is a considerable enlargement of the core at the blossom end, which if crushed, tends to impart a bitter flavor to the juice, but in the use of the improved reamer this core is received in the cavity 8 and thus not disturbed.

The reamer is driven at a preferable low speed by the medium of suitable gearing. In order to provide that the reamer will be positioned in alignment with the shaft of the motor, the speed reducing means preferably employs a gear having internal teeth, such an arrangement providing a suitably large reduction with comparatively small diameter gears. A pinion 9 is fixed to the upper end of the motor shaft, this pinion meshing with a larger gear 10 rotatably mounted on a stud 11 secured in an upper head 12 of the motor housing. A second pinion 13, preferably formed in the extended hub portion of the gear 10 meshes with an internal gear 14 which is supported in a second head 15, there being an extended hollow hub 16 integrally formed with the gear 14 rotatably mounted in the bearing hub 17 of the head 15. The reamer is provided with a shaft 18 across whose lower end is a transverse slot 19. The shaft 18 is slidably fitted in the bore of the hollow hub 16 and a positive drive is afforded by the use of a transverse pin 20 which is secured in the hollow shaft 16 and which coacts with the slot 19.

A collector bowl 21 having a discharge spout 22 at one side and at the bottom thereof is concentrically positioned on the upper head 15. A lug 23 on the head 15 coacts with a notch 24 on the lower side of the bowl to insure the proper positioning of the bowl. The discharge spout 22 projects outwardly and downwardly and may deliver the juice to a trough-like member 25 having a discharge spout 26, this member and its spout being positioned so as to receive the liquid flowing from the bowl 21 and to discharge the liquid into the recepatcle R. The member 25 is so formed that a receptacle R' may be supported thereon to receive the juice directly from the bowl 21, and to that end its upper wall is provided with an opening 25' large enough to receive the bottom of the receptacle which rests upon the lower wall.

The agitator rotates at high speed while the ratio of the gearing is such that the reamer rotates at a comparatively low speed. By reason of the connection described between the shafts 18 and 16 the reamer may be readily removed for cleaning purposes, and for the same purposes the bowl 21 may be also removed. The device is preferably a portable implement designed to stand erectly upon a table, there being outspread feet 27 formed at the lower ends of the bracket 2.

Having thus described my invention, I claim:

1. In a combined juice extracting and mixing machine, a motor and its shaft, a juice extracting mechanism, an agitator connected with the motor shaft, means for operating the juice extracting mechanism from said motor, means for supporting a receptacle in operative relation with the agitator, and a support for supporting a receptacle in operative relation with the juice extractor, said last mentioned support being constructed to convey the juice to the receptacle associated with the agitator when a receptacle is absent from said support.

2. In a combined juice extracting and mixing machine, a motor and its shaft, a juice extracting mechanism driven from said motor, an agitator connected with the motor shaft, means for supporting a receptacle in operative relation with said agitator, and a support for supporting a receptacle in operative relation with said juice extractor, said last mentioned support being in the form of a spout provided with an opening in its upper wall to receive a receptacle, said spout-like support being positioned to discharge juice from said mechanism into the receptacle associated with said agitator when a receptacle is absent from said support.

3. In a combined juice extracting and mixing machine, a motor and its shaft, a juice extracting mechanism consisting of a rotary reamer operatively connected with the motor shaft and a stationary bowl surrounding said reamer, said bowl having a discharge opening, an agitator connected with said motor shaft, means for supporting a receptacle in operative relation with said agitator, and a spout-like support beneath the opening in said bowl and positioned to discharge juice into said receptacle from said bowl, said support being constructed to support a receptacle in a position to receive the juice from said bowl.

4. In a combined juice extracting and mixing machine, a vertically supported motor and its shaft, a juice extracting mechanism mounted on the upper side of the motor and operated thereby, an agitator connected with the lower end of the motor shaft, means for supporting a receptacle in operative relation with said agitator, and a second support to support a receptacle to receive the juice from the juice extracting mechanism, said second support being constructed to receive the juice from said mechanism when a receptacle is absent therefrom and convey the juice to the receptacle which is in operative relation with the agitator.

5. In a combined juice extracting and mixing machine, a vertically supported motor and its shaft, a juice extracting mechanism mounted on the upper side of said motor comprising a reamer operatively connected with said motor shaft and a stationary bowl surrounding said reamer, said bowl having a discharge opening, an agitator connected with said motor shaft, means for supporting a receptacle in operative relation with said agitator, and a second support for supporting a receptacle in operative relation with the discharge opening of said bowl, said second support being constructed to receive the juice from said bowl opening when a receptacle is absent therefrom and convey the juice to the receptacle which is in operative relation with the agitator.

In testimony whereof, I have hereunto set my hand this 1st day of October, 1929.

CLARENCE RINGWALD.